United States Patent [19]

McBain et al.

[11] Patent Number: 5,777,053

[45] Date of Patent: Jul. 7, 1998

[54] IN-MOLD COATING COMPOSITIONS SUITABLE AS IS FOR AN END USE APPLICATION

[75] Inventors: Douglas S. McBain, Norton; David S. Cobbledick, Kent; Henry Shanoski, Akron; Brian J. Sullivan, Mogadore, all of Ohio

[73] Assignee: GenCorp Inc., Fairlawn, Ohio

[21] Appl. No.: 785,514

[22] Filed: Jan. 17, 1997

[51] Int. Cl.⁶ .................... C08F 226/02; C08F 220/18; C08F 212/06; B29B 11/08
[52] U.S. Cl. .................... 526/301; 526/329.2; 526/347; 425/542
[58] Field of Search ................ 526/301, 329.2, 526/347; 425/542

[56] References Cited

U.S. PATENT DOCUMENTS

| | | |
|---|---|---|
| 4,189,517 | 2/1980 | Shanoski et al. |
| 4,222,929 | 9/1980 | Shanoski et al. |
| 4,331,735 | 5/1982 | Shanoski |
| 4,414,173 | 11/1983 | Cobbledick et al. |
| 4,515,710 | 5/1985 | Cobbledick |
| 5,084,353 | 1/1992 | Cobbledick et al. |
| 5,416,880 | 5/1995 | Edwards et al. ............. 385/128 |

Primary Examiner—Joseph L. Schofer
Assistant Examiner—W. C. Cheng
Attorney, Agent, or Firm—Robert F. Rywalski; Daniel J. Hudak

[57] ABSTRACT

An in-mold coating composition for a fiber reinforced plastic comprises an aliphatic resin such as a saturated aliphatic ester intermediate polyurethane having terminal acrylate end groups, a saturated (cyclo)aliphatic (meth) acrylate such as isobornyl acrylate, a hydroxyl alkyl (meth) acrylate, a polyacrylate ester of an alkylene polyol, and a vinyl substituted aromatic. The in-mold coating compositions have good end use weather-resistant properties so that there is no need for a subsequent paint coat thereon which heretofore has been required. The paint-free coating compositions can be either clear or pigmented and can contain various additives such as lubricants, adhesion aids, hardeners, and the like.

20 Claims, 1 Drawing Sheet

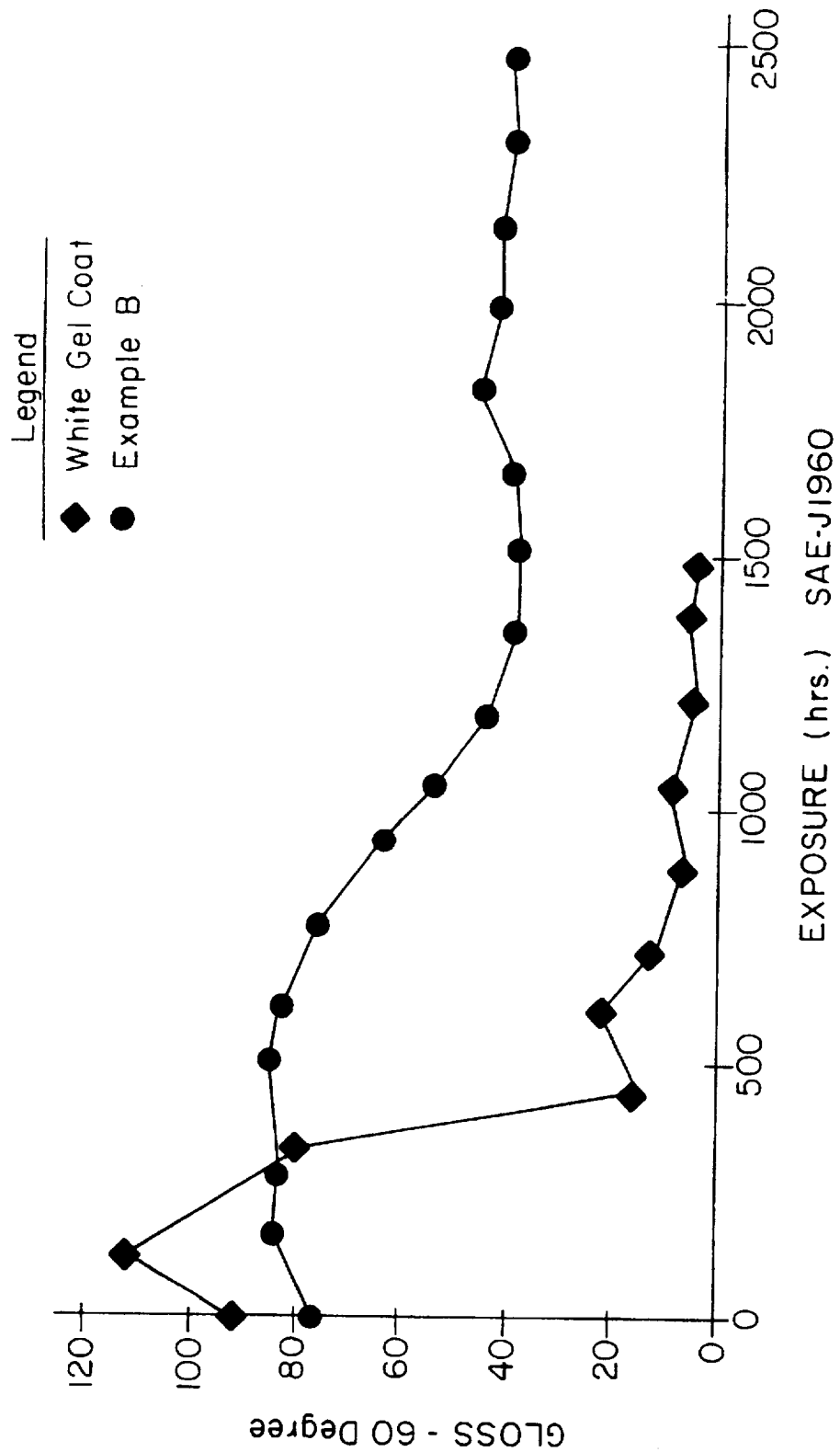

5,777,053

IN-MOLD COATING COMPOSITIONS SUITABLE AS IS FOR AN END USE APPLICATION

FIELD OF THE INVENTION

The present invention relates to fiber reinforced plastic (FRP) having an in-mold composition thereon which is suitable as is for an end use application. More specifically, the invention relates to the utilization of generally saturated aliphatic resins, which can be clear or pigmented, and which have paint-like properties such as high gloss, hardness, good adhesion, and good weatherability, such that they can be utilized as is and do not require a paint coating or other exterior protective coating thereon.

BACKGROUND OF THE INVENTION

Heretofore, in-mold coatings have been applied to fiber reinforced plastics such as sheet molded coatings to generally provide a smooth surface and reduce or eliminate substrate porosity. However, such coatings have required painting to yield desirable end use properties. Typical in-mold coatings as set forth in U.S. Pat. No. 4,189,517, and U.S. Pat. No. 4,222,929, to Shanoski et al., have been the reaction product of an unsaturated fumarate polyester diol, a saturated polyester diol flexibilizer, a crosslinking aliphatic polyol having from 3 to 6 hydroxyl groups, a diisocyanate, and an ethylenically unsaturated crosslinking compound such as styrene.

In-mold coating compositions, as set forth in U.S. Pat. No. 4,331,735, relate to (a) a liquid crosslinkable composition having an average molecular weight of up to about 5,000, having a plurality of polymerizable ethylenic double bonds, being essentially free of active hydrogen atoms or being essentially free of isocyanate groups, (b) a material selected from the group consisting of (I) a polyisocyanate and (II) the reaction product of an excess of equivalents of a polyisocyanate and an ethylenically unsaturated compound having —NH$_2$, —NH— and/or —OH groups, said reaction product being free of active hydrogen atoms and (c) an organic free radical peroxide initiator in an amount sufficient to effect curing of said in-mold coating composition, said (b) being used in an amount sufficient to secure the adhesion of said coating composition to said molded thermoset resin glass fiber composition.

A large number of in-mold coatings relate to coating compositions comprising at least one polymerizable epoxy-based oligomer having at least two acrylate groups thereon, at least one copolymerizable ethylenically unsaturated monomer such as styrene, and at least copolymerizable monoethylenically unsaturated compound having a —CO— group and a —NH$_2$, —NH— and/or —OH group, as well as a polyvinyl acetate as set forth in U.S. Pat. Nos. 4,414,173, and 4,515,710 to Cobbledick et al. Still another in-mold coating relates to an epoxy-based oligomer having two acrylate end groups, and the like, as set forth in U.S. Pat. No. 5,084,353 to Cobbledick.

BRIEF DESCRIPTION OF THE DRAWING

The drawing relates to a chart comparing the gloss retention of the present invention with a commercial white gel coat composition.

SUMMARY OF THE INVENTION

The cured in-mold coating compositions are made from compounds which include a saturated polyester urethane acrylate containing a saturated aliphatic polyester intermediate and a saturated aliphatic urethane group; and a saturated hydroxyl alkyl (meth)acrylate. Additionally, the use of a diacrylate ester of an alkylene diol, a saturated (cyclo) aliphatic (meth)acrylate, and a vinyl substituted aromatic have been found to impart paint coating type properties to the in-mold coating composition such as hardness, water resistance, low shrinkage, and high gloss. Optionally, in addition to the above compounds, occasionally, crosslinking agents can be utilized such as triallylcyanurate, ethoxylated trimethylolpropane triacrylate, pentaerythritol triacrylate, and the like.

The above components are reacted in the presence of a peroxide initiator to chain extend and form a thermoset resin. The cured resin is a clear in-mold coating composition unless pigmented. The present invention thus eliminates the additional step, time and cost of applying a painted coating to the surface of a conventional in-mold coating and forms a paint-free FRP end product laminate. If a clear coating is not desired, various pigments, colorants, etc., are added to the components to yield a desired end color and opacity.

In order to achieve the in-mold coating compositions of the present invention which have paint-like properties, various compounds and resins are avoided, especially aromatic compounds such as aromatic polyesters and/or polyether urethane intermediates, aromatic epoxy-based resins, and the like.

DETAILED DESCRIPTION OF THE INVENTION

An important aspect of the present invention, in order to achieve good paint-like properties and a clear color of the in-mold coating composition, is the utilization of a saturated aliphatic polyester intermediate urethane which contains acrylate groups, generally at the terminal portions of the polymer. The polyester intermediate of the urethane can be made from aliphatic dicarboxylic acids or aliphatic anhydrides and glycols and such are well known to the art and to the literature as is the preparation thereof, and are commercially available. The aliphatic dicarboxylic acids and anhydrides have from 1 to 15 carbon atoms and are desirably saturated (i.e., have no unsaturated carbon to carbon double bonds, with specific examples including carbonic acid, malonic acid, succinic, glutaric acid, adipic acid, pimelic acid, suberic acid, azelaic acid, sebacic acid, the anhydride counterparts thereof, and the like, with adipic acid generally being preferred. Mixtures of all of the above acids can be utilized as well. The glycols or diols generally have from 2 to 15 carbon atoms and are saturated with specific examples including ethylene glycol, propylene glycol, 1,3-butylene glycol, 1,4-butylene glycol, pentane diol, hexane diol, cyclohexanedimethanol dipropylene glycol, 2,2-dimethyl-1,3-propane diol, diethylene glycol, pinacol, and the like. Preferred glycols include ethylene glycol and neopentyl glycol.

The saturated aliphatic polyester intermediate generally has a number average molecular weight of from about 1,000 to about 5,000, and desirably from about 1,500 to about 2,500.

An aliphatic polyisocyanate is reacted with the saturated polyester intermediate to form a polyurethane type resin. The aliphatic portion is saturated and has from about 5 to 18 carbon atoms such as isophorone diisocyanate (IPDI), hexamethylene diisocyanate, cyclohexyl diisocyanate, and the like, with isophorone diisocyanate being preferred. The average equivalent ratio of NCO groups to OH end groups of the intermediate is approximately from about 1.5 to about 2.5, desirably from about 1.9 to about 2.1, and preferably about 2.0. Such amounts are generally sufficient to form an isocyanate terminated polyurethane prepolymer which is then reacted with a hydroxyl alkyl acrylate to form the saturated polyester urethane containing an acrylate or methacrylate generally at the terminal portions of the polymer chain. The acrylates can generally have an ester portion containing from 2 to 10 carbon atoms, such as ethyl, propyl, n-butyl, ethylhexyl, and the like, with ethyl and propyl being preferred. An example of a preferred polyester urethane acrylate is Craynor CN 963, manufactured by Sartomer Corporation, which is a polyester urethane acrylate.

Polyester urethane acrylates are avoided which contain unsaturated and/or aromatic polyester intermediates, as are aromatic and/or unsaturated diisocyanates, inasmuch as they may yield a clear coating or a non-clear coating with a tendency to yellow and degrade on aging. The polyester urethane acrylates are hence substantially free of such compounds, meaning that they generally contain unsaturated and/or aromatic polyester intermediates in an amount less than 50 or 25 percent by weight, desirably less than 10 percent by weight, and preferably less than 5 percent by weight, or none at all, of such units or groups based upon the total weight of such polymer(s). Similarly, generally less than 50 or 25 percent and preferably less than 10 or 5 mole percent, or none at all, of all diisocyanate groups within the coating composition are aromatic and/or unsaturated groups based upon the total moles of isocyanate required. Other compounds or monomers which are avoided in the formation of the polyester urethane acrylates are polyethers and epoxy intermediates inasmuch as the same have been found not to yield an in-mold coating composition which provides good weatherability properties. Thus, the polyurethane intermediate generally contains less than 50 percent by weight and generally less than 25 percent by weight, and preferably less than 10 percent or 5 percent by weight, or none at all of polyether and/or epoxy groups based upon the total weight of the polyester urethane acrylates.

Various compounds or components are utilized to react with the polyester urethane acrylate and form a thermoset resin. One such component is an aliphatic or cycloaliphatic (meth)acrylate wherein the aliphatic and/or cycloaliphatic portion is saturated and contains from about 1 to about 50 carbon atoms and desirably from about 2 to about 20 carbon atoms. Representative examples include methyl (meth) acrylate, tetrahydrofurfuryl methacrylate, isodecylmethacrylate, 2(2-ethoxy)ethoxy ethylacrylate, stearyl acrylate, tetrahydrofurfuryl acrylate, lauryl methacrylate, stearyl methacrylate, lauryl acrylate, glycidyl methacrylate, isodecyl acrylate, isobornyl methacrylate, isooctyl acrylate, tridecyl acrylate, tridecyl methacrylate, and caprolactone acrylate, with isobornyl acrylate being preferred. The amount of the saturated (cyclo)aliphatic (meth)acrylate is generally from about 20 to about 100 parts by weight, desirably from about 35 to about 90 parts by weight, and preferably from about 50 to about 80 parts by weight per 100 total parts by weight of the polyester urethane acrylate.

Another component utilized in the present invention is one or more hydroxy alkyl (meth)acrylates, wherein the alkyl group can contain from 1 to 5 or 10 carbon atoms, such as methyl, ethyl, butyl, etc., with propyl being preferred. The amount of such hydroxy alkyl (meth)acrylates is generally from about 2 to about 20 parts by weight, desirably from about 6 to about 16 parts by weight, and preferably from about 8 to about 12 parts by weight per 100 parts by weight of the polyester urethane acrylate. These compounds are utilized in addition to the hydroxy alkyl methacrylates utilized to form the polyester urethane acrylate resins.

Still another component utilized in the in-mold coating compositions of the present invention are one or more vinyl substituted aromatics containing a total of from 8 to 12 carbon atoms such as styrene, α-methyl-styrene, vinyl toluene, t-butyl styrene, and the like, with styrene being preferred. The amount of this component is generally from about 10 to about 70 parts by weight, desirably from about 20 to about 60 parts by weight, and preferably from about 30 to about 50 parts by weight per 100 parts by weight of the polyester urethane acrylate.

Still another component is a polyacrylate such as a triacrylate or preferably a diacrylate ester of an alkylene polyol wherein the polyol has from about 2 to about 30 carbon atoms and preferably from about 2 to about 10 carbon atoms such as ethylene diol, butane diol, and the like. An acrylate which is contained on both ends of the alkylene polyol is generally derived from acrylic acid or methacrylic acid. Examples of the preferred diacrylate ester of an alkylene diol include triethylene glycol dimethacrylate, ethylene glycol dimethacrylate, tetraethylene glycol dimethacrylate, polyethylene glycol dimethacrylate, 1,3 butylene glycol diacrylate, 1,4-butanediol diacrylate, 1,4-butanediol dimethacrylate, diethylene glycol diacrylate, diethylene glycol dimethacrylate, 1,6 hexanediol diacrylate, 1,6 hexanediol dimethacrylate, neopentyl glycol diacrylate, neopentyl glycol dimethyacrylate, polyethylene glycol (600) dimethacrylate, polyethylene glycol (200) diacrylate, tetraethylene glycol diacrylate, triethylene glycol diacrylate, 1,3 butylene glycol dimethacrylate, tripropylene glycol diacrylate, polyethylene glycol (400) diacrylate, polyethylene gylcol (400) dimethacrylate, polyethylene glycol (600) diacrylate, propoxylated neopentyl glycol diacrylate, and alkoxylated aliphatic diacrylate. Examples of trifunctional acrylate esters of an alkylene polyol which can be optionally utilized include tris(2-hydroxy ethyl) isocyanurate trimethacrylate, trimethylolpropane trimethacrylate, trimethylolpropane triacrylate, tris (2-hydroxy ethyl) isocyanurate triacrylate, tris(2-hydroxy ethyl) isocyanurate triacrylate, ethoxylated trimethylolpropane triacrylate, pentaerythritol triacrylate, propoxylated trimethylolpropane triacrylate, and propoxylated glyceryl triacrylate. The amount of the polyacrylate ester of the alkylene polyol is generally from about 10 to about 40 parts by weight, desirably from about 15 to about 35 parts by weight, and preferably from about 20 to about 30 parts by weight for every 100 parts by weight of the polyester urethane acrylate. The amount of the optional triacrylate ester of the alkylene polyol is low and generally is less than 10 parts by weight and preferably less than 5 parts by weight for every 100 parts by weight of the polyester urethane acrylate.

The above five components generally form the resin of the in-mold coating composition of the present invention. The coating composition is clear. Alternatively, the clear coating can be colored by utilizing a pigment, a colorant, etc., in a desired or effective amount to yield a desired color, tint, hue, or opacity. Pigments and pigment dispersions are well known to the art and include, for example, titanium dioxide, carbon black, phthalocyanine blue, phthalocyanine red, chromium and ferric oxides, and the like.

The in-mold coating compositions of the present invention can also contain conventional additives, and fillers, etc., in conventional amounts. Thus, various cure inhibitors such as benzoquinone, hydroquinone, methoxyhydroquinone, p-t-butylcatechol, and the like, can be utilized. Another additive is an accelerator such as cobalt octoate. Other classes of accelerators include zinc, or other metal carboxylates. Various light stabilizers can be utilized such as, for example, the various hindered amines (HALS), substituted benzophenones, and substituted benztriazoles, and the like. Lubricants and mold release agents are generally utilized with specific examples including various metal stearates, such as zinc stearate or calcium stearate or phosphonic acid esters. Reinforcing fillers such as talc can be utilized. Talc has also been found to help promote adhesion of the in-mold coating composition to the fiber reinforced plastic substrate. Another additive is a hardener and thixotrope such as silica. The polyester urethane acrylate and the other curing monomers or components of the present invention are chain extended through the utilization of a free radical initiator such as a peroxide. Examples of suitable free radical initiators include tertiary butyl perbenzoate, tertiary butyl peroctoate in diallyl phthalate, diacetyl peroxide in dimethyl phthalate, dibenzoyl peroxide, di(p-chlorobenzoyl) peroxide in dibutyl phthalate, di(2,4-dichlorobenzoyl) peroxide in dibutyl phthalate dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumylhydroperoxide, diacetyl peroxide, t-butyl hydroperoxide, ditertiary butyl peroxide, 3, 5-dihydroxy-3, 5-dimethyl-1,2-oxacyclopentane, and 1,1-bis(t-butylperoxy)-3,3,5-trimethyl cyclohexane and the like, and mixtures thereof. It is desirable sometimes to use mixtures of initiators to take advantage of their different decomposition rates and times at different temperatures and so forth. A preferred initiator to use is tertiary butyl perbenzoate. The peroxide initiator should be used in an amount sufficient to overcome the effect of the inhibitor and to cause curing of the ethylenically unsaturated compounds. In general, the peroxide initiator is used in an amount of up to about 5% or from about 0.25 to about 5%, desirably from about 1 to about 4 percent, and preferably from about 1 to about 2% by weight based on the total weight of all of the ethylenically unsaturated components employed in the in-mold coating compositions. The reaction of the polyester urethane acrylate with the curing components in the presence of the peroxide initiator is generally at a temperature of from about 200° F. (93° C.) to about 330° F. (165° C.), and desirably from about 270° F. (132° C.) to about 310° F. (154° C.).

The in-mold coating composition of the present invention is prepared as follows. The polyester urethane acrylate is mixed with the vinyl substituted aromatic monomers such as styrene, the saturated aliphatic or cycloaliphatic (meth) acrylates such as isobornyl acrylate, and the hydroxylalkyl methacrylate such as hydroxypropyl methacrylate. After these compounds are mixed, the above-noted fillers and additives such as cure inhibitors, light stabilizers, lubricants, etc., are added and mixed. The free radical peroxide initiator is added last. The polyacrylate ester of a polyol can be present in the polyester urethane acrylate from the supplier. When an in-mold coating having a specific color is desired, one or more pigments, colorants, etc., can be utilized in suitable amounts. As known to the art, often times various pigments or colorants are added with a carrier, for example, a polyester, so that they can be easily blended. Any conventional or suitable mixing vessel can be utilized, and the various components and additives mixed until the compounds are blended. Even if pigments are not contained in the blend, the mixture at this point is not clear. When desired, the mixed ingredients are coated onto a fiber reinforced plastic such as a sheet molded compound as by injection molding with the in-mold coating composition heated to a cure temperature. The cure temperature will vary depending upon the particular curative or peroxide utilized. Suitable cure temperatures generally range from about 200° to about 330° F. (from about 93° to about 165° C.). Upon cure or chain extension, the in-mold coating compound becomes clear. Traditionally, clarity can be measured by a subjective eye test, that is, the lack of any imparted color to an underlying substrate. In accordance with the present invention, clarity can also be demonstrated by measuring the color of a substrate with a color spectrophotometer, both before and after coating with the present invention. The data presented in Table I was obtained with a Datacolor Spectraflash® SF 600® color spectrophotometer equipped with Datamatch 600 software for paint and coatings, available from Datacolor International/Americas of Charlotte, N.C. The data shown in Table I shows that the brightness ($L^*$) and color ($a^*$ and $b^*$) are similar for both uncoated and coated substrates, where the same clear coating (Recipe A) is used in each case.

The molded in-mold coating compositions of the present invention have very good properties such as good high clarity (i.e., lack of color), good adhesion to an FRP substrate such as a sheet molded compound, good hardness, for example, a pencil hardness of at least H and desirably at least 2H, good scratch resistance, good water resistance, as well as good ultraviolet resistance. The cured thermoset in-mold coating compositions of the present invention have smooth surfaces and also have high 60 degree gloss values of at least 70 and desirably at least 80. Gloss levels can also be affected by the surface and condition of the tooling used to mold parts and apply the coating. Such properties result in an in-mold coating which has a finished surface since it has good weatherability resistance and other good paint properties so that painting, which heretofore has been required, is not needed. That is, the in-mold coating composition when cured can be utilized as is with regard to a particular end use application and does not need, or is substantially free of any subsequent surface treatments, e.g., coating, another layer, etc., such as a paint, and the like. In other words, the in-mold coating composition surface is substantially treatment free meaning that generally less than 10 grams and preferably less than 5, 3, or 2 or 1 grams by weight per sq. ft. of any protective coating, film, layer, or surface treatment is applied, and preferably is totally free thereof.

The in-mold coating compositions of the present invention are generally flexible and can be utilized on any surface of a fiber reinforced plastic substrate which can be a thermoplastic or a thermoset, on sheet molded compounds which are generally thermosets, on low pressure molding compounds (LPMC), and the like. Suitable end uses of the "finished" or "as is" in-mold coating compositions of the present invention include various automotive parts such as spoilers, air dams, truck liners, patio furniture, satellite dishes, water craft components, and the like.

The invention will be better understood by reference to the following examples which serve to illustrate, but not to limit the scope of the present invention.

EXAMPLES

Recipes A, B, and C, set forth hereinbelow were mixed and molded as follows:

Mixing Procedure:

Recipe A

The polyester urethane acrylate, diacrylic ester of hexane diol, styrene, isobornyl acrylate and hydroxypropyl methacrylate in the indicated amount were added to a container and mixed thoroughly using conventional mixing procedures for organic resin solutions. The hydroquinone, cobalt octoate, hindered amine light stabilizer (HALS), UV absorber, and zinc and calcium stearates were weighed into the resin solution prepared above, and again mixed thoroughly to dissolve the organics and disperse the stearates. The talc and silica were then weighed into the container with the organics and stearates, and mixed thoroughly to disperse the solids. All of the mixing occurred without external heating.

The peroxide initiator was added to the in-mold coating solution prepared above, and mixed thoroughly.

The FRP molding was prepared in a 16×16" chromed steel shear-edge mold from a conventional polyester SMC used commercially to prepare exterior automotive body panels. Molding conditions for the SMC were 300° F., (149° C.) a seventy second cure time, and 1000 psi of pressure.

The coating was applied immediately following SMC cure by opening the mold, pouring in the coating on the FRP molding, and re-close of the mold. Cure conditions for the IMC were 300° F., (149° C.) a sixty second cure time, and 1000 psi of pressure.

Recipe B

Same as Recipe A, with the exception of the addition and mixing of the white pigment dispersion following the dispersion of the talc and silica, prior to the addition of the peroxide initiator.

Preparation of in-mold coated FRP panels was the same as for Recipe A.

Recipe C

Same as Recipe A, with the exception of the addition and mixing of a phthalocyanine blue pigment dispersion.

Preparation of in-mold coated FRP panels was the same as for Recipe A.

RECIPE A
CLEAR-COAT

| | PARTS BY WT. |
|---|---|
| Polyester urethane acrylate | 100.0 |
| Diacrylic ester of hexane Diol | 25.0 |
| Styrene | 42 |
| Isobornyl acrylate | 66 |
| Hydroxypropyl methacrylate | 10.1 |
| Hydroquinone | 0.23 |
| 12% Cobalt octoate in mineral oil | 0.29 |
| Hindered amine light stabilizer | 1.7 |
| UV absorber | 3.4 |
| Zinc stearate | 5.5 |
| Calcium stearate | 1.8 |
| Talc | 11.4 |
| Silica | 6.8 |
| Tertiary butyl perbenzoate | 3.61 |

RECIPE B
WHITE COLOR-COAT

| | PARTS BY WT. |
|---|---|
| Polyester urethane acrylate | 100.0 |
| Diacrylic ester of hexane diol | 25.0 |
| Styrene | 42 |
| Isobornyl acrylate | 66 |
| Hydroxypropyl methacrylate | 10.1 |
| Hydroquinone | 0.23 |
| 12% Cobalt octoate in mineral oil | 0.29 |
| Hindered amine light stabilizer | 1.7 |
| DV absorber | 3.4 |
| Zinc stearate | 5.5 |
| Calcium stearate | 1.8 |
| Talc | 11.4 |
| Silica | 6.8 |
| Titanium dioxide pigment dispersion (30 wt % in unsaturated polyester) | 27.4 |
| Tertiary butyl perbenzoate | 3.61 |

RECIPE C
BLUE COLOR-COAT

| | PARTS BY WT. |
|---|---|
| Polyester urethane acrylate | 100.0 |
| Diacrylic ester of hexane diol | 25.0 |
| Styrene | 42 |
| Isobornyl acrylate | 66 |
| Hydroxypropyl methacrylate | 10.1 |
| Hydroquinone | 0.23 |
| 12% Cobalt octoate in mineral oil | 0.29 |
| Hindered amine light stabilizer | 1.7 |
| UV absorber | 3.4 |
| Zinc stearate | 5.5 |
| Calcium stearate | 1.8 |
| Talc | 11.4 |
| Silica | 6.8 |
| Phthalocyanine blue pigment dispersion (25 wt % in unsaturated polyester) | 13.7 |
| Tertiary butyl perbenzoate | 3.61 |

Recipes A, B, and C were tested with regard to various properties such as pencil hardness, tape adhesion, chip resistance and gloss as well as accelerated weathering and humidity adhesion and the results thereof are set forth in Tables 2 through 6.

TABLE 1

CIE L* a *b* Color Space
D65 Illuminant, 10° Observer

| SUBSTRATE | L* | a* | b* |
|---|---|---|---|
| White uncoated | 85.6 | −0.86 | 3.03 |
| White coated (Recipe A) | 82.7 | −1.12 | 5.56 |
| Grey uncoated | 64.9 | −0.03 | −0.98 |
| Grey coated (Recipe A) | 55.4 | −0.39 | 1.02 |
| Black uncoated | 26.2 | 0.18 | −0.76 |
| Black coated (Recipe A) | 25.7 | 0.17 | −0.53 |

As noted above, very little color change occurs utilizing the clear coating of the present invention.

TABLE 2

INITIAL COATING PROPERTIES

| | RECIPE A | RECIPE B | RECIPE C |
|---|---|---|---|
| Pencil hardness | H | H | H |
| Tape adhesion | 100% | 100% | 100% |

TABLE 2-continued

INITIAL COATING PROPERTIES

|  | RECIPE A | RECIPE B | RECIPE C |
|---|---|---|---|
| (GM9071P) Cross-hatch tape adhesion (Ford B1 106-1) | 0 | 0 | 0 |
| Chip resistance (GM9506P) | 8 | 8 | 8–9 |
| 60° Gloss | 78 | 81 | 76 |

TABLE 3

COATING PROPERTIES AFTER 96 HR HUMIDITY EXPOSURE (GM4388M, GM4465P)

|  | RECIPE A | RECIPE B | RECIPE C |
|---|---|---|---|
| Pencil hardness | H | H | F–H |
| Tape adhesion (GM9071P) | 100% | 100% | 100% |
| Cross-hatch tape adhesion (Ford B1 106-1) | 0 | 0 | 0 |
| Chip resistance (GM9506P) | 8 | 8 | 8 |
| 60° Gloss | 72 | 79 | 73 |

TABLE 4

COATING PROPERTIES AFTER 10 DAY WATER IMMERSION (FORD ESB-M2P124-A1)

|  | RECIPE A | RECIPE B | RECIPE C |
|---|---|---|---|
| Pencil hardness | F–H | H | HB–F |
| Tape adhesion (GM9071P) | 100% | 100% | 100% |
| Cross-hatch tape adhesion (Ford B1 106-1) | 0 | 0 | 0 |
| Chip resistance (GM9506P) | 8 | 8 | 8–9 |
| 60° Gloss | 77 | 68 | 76 |

TABLE 5

COATING 60° GLOSS AFTER ACCELERATED WEATHERING (SAE J1960)

|  | RECIPE A | RECIPE B | RECIPE C |
|---|---|---|---|
| Initial | 78 | 81 | 76 |
| 500 hours | 76 | 86 | 75 |
| 1,000 hours | 72 | 55 | 70 |
| 2,000 hours | 58 | 43 | 50 |

TABLE 6

COATING PROPERTIES AFTER SIX (6) MONTH SOUTH FLORIDA EXPOSURE (5° SOUTH/BLACK BOX EXPOSURE)

|  | RECIPE A | RECIPE B | RECIPE C |
|---|---|---|---|
| 60° Gloss | 79 | 77 | 76 |
| Initial: Cross-hatch tape adhesion (GM9071P;A) | 100% | 100% | 100% |
| Initial: Cross-hatch tape adhesion (GM9071P;B) | 100% | 100% | 100% |
| After 96-hour humidity exposure: Cross-hatch tape adhesion (GM9071P;A) | 100% | 100% | 100% |
| After 96-hour humidity exposure: Cross-hatch tape adhesion (GM9071P;B) | 99% | 97% | 100% |

As apparent from the tables, the in-mold coating compositions of the present invention when cured had good properties such as pencil hardness, adhesion, weatherability, and the like. The compositions of the present invention also had good gloss retention generally of at least 50%, 60%, 70%, 75%, or 80% of initial gloss, generally for at least 1,000 hours, and preferably even in an excess of 2,000 hours.

Example B of the present invention was compared with a white gel coat, which was a commercialized gel coat sold by a leading manufacturer to coat composite material watercraft. Such gel coat materials are commercially available from many manufacturers including CCP (Cook Composites and Polymers) Kansas City, Mo.; Neste of Fort Smith, Ark.; and Lilly Industries of Elkhart, Ind. Gel coats are typically used in the composite industry as an appearance layer on a fiber reinforced plastic prepared by spray lay-up (or open) molding. As such, gel coats are intended for appearance and do not require paint. As apparent from the drawing, the in-mold coating composition of the present invention had very good gloss retention, even after 2,500 hours, as compared to the rapid gloss drop off at 500 hours of the control white gel coat.

While in accordance with the Patent Statutes, the best mode and preferred embodiment has been set forth, the scope of the invention is not limited thereto, but rather by the scope of the attached claims.

What is claimed is:

1. An in-mold coating composition, comprising:
   (a) a saturated aliphatic polyester urethane acrylate, said polyester portion being derived from at least a saturated carboxylic acid or an anhydride thereof and a saturated diol, said urethane portion being derived from an aliphatic saturated polyisocyanate;
   (b) an aliphatic or cycloaliphatic (meth)acrylate wherein said aliphatic or said cycloaliphatic group is saturated and has from 1 to 50 carbon atoms;
   (c) a hydroxyalkyl (meth) acrylate wherein said alkyl group has from 1 to 10 carbon atoms,
   (d) a vinyl substituted aromatic having from 8 to 12 carbon atoms, and,
   (e) a polyacrylate ester of an alkylene polyol wherein said alkylene group has from 2 to 30 carbon atoms.

2. An in-mold coating composition according to claim 1, wherein said (a) saturated carboxylic acid or anhydride has from 1 to 15 carbon atoms, wherein said (a) saturated diol contains from 2 to 15 carbon atoms, wherein said (a) saturated polyisocyanate includes a diisocyanate containing from 5 to 18 carbon atoms, wherein said (b) saturated aliphatic or cycloaliphatic (meth)acrylate has from 2 to 20 carbon atoms, wherein said alkyl group of said (c) hydroxylalkyl (meth) acrylate has from 1 to 5 carbon atoms, and wherein said (e) alkylene group of said polyol has from 2 to 10 carbon atoms.

3. An in-mold coating composition according to claim 2, wherein the amount of said (b) saturated aliphatic or cycloaliphatic (meth)acrylate is from about 20 to about 100 parts by weight for every 100 parts by weight of said (a) saturated aliphatic polyester urethane acrylate, wherein the amount of said (c) hydroxy alkyl (meth) acrylate is from about 2 parts to about 20 parts by weight for every 100 parts by weight of said (a) saturated aliphatic polyester urethane acrylate, wherein the amount of said (d) vinyl substituted aromatic is from about 10 to about 70 parts by weight for every 100 parts by weight of said (a) saturated aliphatic polyester urethane acrylate, and wherein the amount of said (e) diacrylate ester of an alkylene polyol is from 10 to 40 parts by weight for every 100 parts by weight of said (a) saturated aliphatic polyester urethane acrylate.

4. An in-mold coating composition according to claim 3, wherein the number average molecular weight of said (a) saturated polyester portion is from about 1,000 to about 5,000, wherein said (b) saturated aliphatic or cycloaliphatic (meth)acrylate is isobornyl acrylate and wherein the amount thereof is from about 50 to about 80 parts by weight, wherein the amount of said (c) hydroxyalkyl (meth) acrylate is from about 6 to about 16 parts by weight, wherein the amount of said (d) vinyl substituted aromatic is from about 20 to about 60 parts by weight, and wherein the amount of said (e) polyacrylate ester of an alkylene polyol is from about 15 to about 35 parts by weight.

5. An in-mold coating composition according to claim 4, wherein said (a) saturated aliphatic polyester urethane acrylate is prepared from neopentyl glycol, ethylene glycol, adipic acid, isophorone diisocyanate, and hydroxyethyl (meth)acrylate, wherein said (c) hydroxyalkyl (meth)acrylate is hydroxypropyl methacrylate, wherein said (d) vinyl substituted aromatic is styrene, and wherein said (e) polyacrylate ester of an alkylene polyol is a diacrylic ester of hexane diol.

6. An in-mold coating composition according to claim 1, wherein said composition is reacted utilizing a peroxide initiator.

7. An in-mold coating composition according to claim 4, wherein said composition is reacted with from about 0.25 to about 5.0 percent by weight of a peroxide initiator based upon the total weight of all of the ethylenically unsaturated components employed in the in-mold coating composition.

8. A cured, in-mold coating composition, comprising:
the reaction product of (a) a saturated aliphatic polyester urethane acrylate, said polyester portion derived from at least a saturated carboxylic acid or anhydride thereof and a saturated diol, (b) an aliphatic or cycloaliphatic (meth)acrylate wherein said aliphatic or said cycloaliphatic group is saturated and has from 1 to 50 carbon atoms, (c) a hydroxylalkyl (meth)acrylate, (d) a vinyl substituted aromatic having a total of from 8 to 12 carbon atoms, and (e) a polyacrylate ester of an alkylene polyol wherein said alkylene group has from 2 to 12 carbon atoms in the presence of a peroxide initiator.

9. A cured, in-mold coating composition according to claim 8, wherein the amount of said (b) saturated aliphatic or cycloaliphatic (meth)acrylate is from about 20 to about 100 parts by weight for every 100 parts by weight of said (a) saturated aliphatic polyester urethane acrylate, wherein the amount of said (c) hydroxyalkyl (meth) acrylate is from about 2 parts to about 20 parts by weight for every 100 parts by weight of said (a) saturated aliphatic polyester urethane acrylate, wherein the amount of said (d) vinyl substituted aromatic is from about 10 to about 70 parts by weight for every 100 parts by weight of said (a) saturated aliphatic polyester urethane acrylate, and wherein the amount of said (e) polyacrylate ester of an alkylene polyol is from 10 to 40 parts by weight for every 100 parts by weight of said (a) saturated aliphatic polyester urethane acrylate.

10. A cured, in-mold coating composition according to claim 9, wherein said (a) saturated carboxylic acid or anhydride has from 1 to 15 carbon atoms, wherein said (a) saturated diol contains from 2 to 15 carbon atoms, wherein said (a) saturated polyisocyanate includes a diisocyanate containing from 5 to 18 carbon atoms, wherein said (b) saturated aliphatic or cycloaliphatic (meth)acrylate has from 2 to 20 carbon atoms, wherein said alkyl group of said (c) hydroxylalkyl (meth) acrylate has from 1 to 5 carbon atoms, and wherein said (e) alkylene group of said polyol has from 2 to 10 carbon atoms.

11. A cured, in-mold coating composition according to claim 10, wherein the number average molecular weight of said (a) saturated polyester portion is from about 1,000 to about 5,000, wherein said saturated aliphatic polyester urethane acrylate is prepared from neopentyl glycol, ethylene glycol, adipic acid, isophorone diisocyanate, and hydroxyethyl (meth)acrylate.

wherein said (b) saturated aliphatic or cycloaliphatic (meth)acrylate is isobornyl acrylate and wherein the amount: thereof is from about 50 to about 80 parts by weight, wherein said (c) hydroxyalkyl (meth)acrylate is hydroxypropyl methacrylate and wherein the amount thereof is from about 6 to about 16 parts by weight, wherein said (d) vinyl substituted aromatic is styrene and wherein the amount thereof is from about 30 to about 50 parts by weight, and wherein said (e) polyacrylate ester of an alkylene polyol is a diacrylic ester of hexane diol and wherein the amount thereof is from about 15 to about 35 parts by weight.

12. A cured, in-mold coating composition according to claim 8, adhered to a fiber reinforced plastic substrate.

13. A cured, in-mold coating composition according to claim 11, adhered to a fiber reinforced plastic substrate.

14. A cured, in-mold coating composition according to claim 12, wherein said in-mold coating composition is substantially free of any other layer thereon.

15. A cured, in-mold coating composition according to claim 13, wherein said in-mold coating composition has less than 3 grams per sq. ft. of any layer thereon.

16. A cured, in-mold coating composition according to claim 12, wherein said coating composition has a 60 degree gloss retention of at least 75% of its original value according to SAE J1960 after 1,000 hours.

17. A process for molding an in-mold coating composition onto a fiber reinforced plastic substrate and forming a coating thereon of a predetermined thickness, comprising:

molding said substrate between separable dies which coact in a first fully-closed position to define a mold cavity corresponding in size and shape to the substrate;

allowing said substrate to harden in said cavity;

separating one of said dies from said substrate to provide a first gap therebetween which is greater than said predetermined thickness of said coating;

injecting a metered amount of in-mold coating composition into said first gap, said amount being sufficient to provide said predetermined thickness but insufficient to fill said first gap;

applying molding pressure to said one die to reduce said first gap to a second gap which is commensurate with said predetermined thickness and to distribute said injected material substantially uniformly throughout said second gap and over said surface;

maintaining said pressure while said material bonds to said surface and solidifies sufficiently to permit complete separation of said dies without disruption of the coating thus formed; and completely separating said dies and removing said coated substrate from said cavity;

the improvement comprising an in-mold composition which includes the reaction product of (a) a saturated aliphatic polyester urethane acrylate, said polyester portion derived from at least a saturated carboxylic acid or an anhydride thereof and a saturated diol, (b) an aliphatic or cycloaliphatic (meth)acrylate, (c) a hydroxylalkyl (meth)acrylate, (d) a vinyl substituted aromatic having a total of from 8 to 12 carbon atoms, and (e) a polyacrylate ester of an alkylene polyol wherein said alkylene group has from 2 to 12 carbon atoms, in the presence of a peroxide initiator so that a cured in-mold coating composition is produced.

18. A process for molding an in-mold coating composition according to claim 17, wherein said (a) saturated carboxylic acid or anhydride has from 1 to 15 carbon atoms, wherein said (a) saturated diol contains from 2 to 15 carbon atoms, wherein said (a) saturated polyisocyanate includes a diisocyanate containing from 5 to 18 carbon atoms, wherein said (b) aliphatic or cycloaliphatic (meth)acrylate is saturated and has from 2 to 20 carbon atoms, wherein said alkyl group of said (c) hydroxylalkyl (meth)acrylate has from 1 to 5 carbon atoms, and wherein said (e) alkylene group of said polyol has from 2 to 10 carbon atoms.

19. A process for molding an in-mold coating composition according to claim 18, wherein the amount of said (b) saturated aliphatic or cycloaliphatic (meth)acrylate is from about 20 to about 100 parts by weight for every 100 parts by weight of said (a) saturated aliphatic polyester urethane acrylate, wherein the amount of said (c) hydroxyalkyl (meth)acrylate is from about 2 parts to about 20 parts by weight for every 100 parts by weight of said (a) saturated aliphatic polyester urethane acrylate, and wherein the amount of said (d) vinyl substituted aromatic is from about 10 to about 70 parts by weight for every 100 parts by weight of said (a) saturated aliphatic polyester urethane acrylate, and wherein the amount of said (e) polyacrylate ester of an alkylene polyol is from 10 to 40 parts by weight for every 100 parts by weight of said (a) saturated aliphatic polyester urethane acrylate.

20. A process for molding an in-mold coating composition according to claim 19, wherein said (a) saturated aliphatic polyester urethane acrylate is prepared from neopropyl glycol, ethylene glycol, adipic acid, isophorone diisocyanate, and hydroxyethyl (meth)acrylate, wherein said (c) hydroxyalkyl (meth)acrylate is hydroxypropyl methacrylate, wherein said (d) vinyl substituted aromatic is styrene, and wherein said (e) polyacrylate ester of an alkylene polyol is a diacrylic ester of hexane diol.

* * * * *